July 1, 1924.
G. A. PARKER
SAFETY OR RELIEF VALVE
Filed May 27, 1922
1,499,840
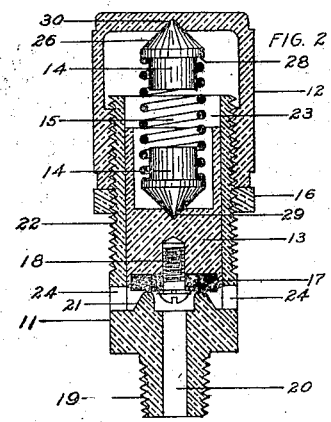
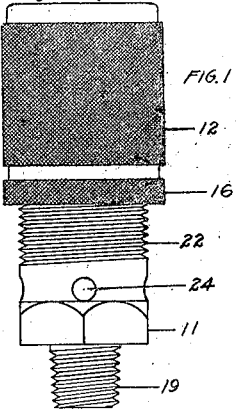
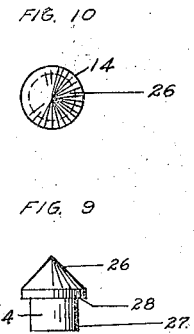
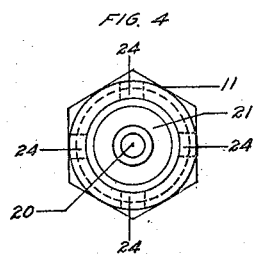
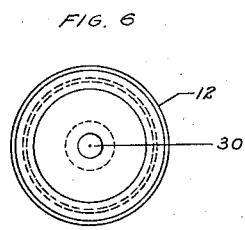
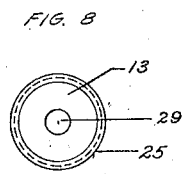
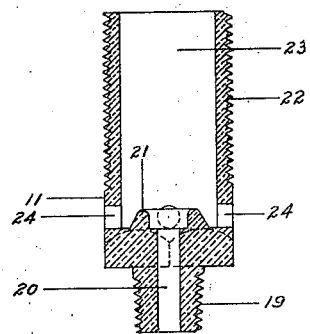
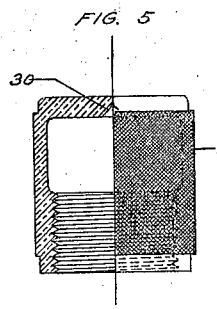
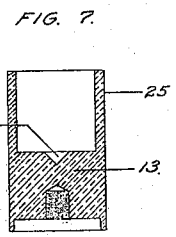
Inventor
George A. Parker
By Martin & Rendell
Attorneys Patented July 1, 1924.

1,499,840

UNITED STATES PATENT OFFICE.

GEORGE A. PARKER, OF UTICA, NEW YORK, ASSIGNOR TO BRUNNER MANUFACTURING COMPANY, OF UTICA, NEW YORK, A CORPORATION.

SAFETY OR RELIEF VALVE.

Application filed May 27, 1922. Serial No. 564,190.

*To all whom it may concern:*

Be it known that I, GEORGE A. PARKER, a citizen of the United States, and a resident of Utica, in the county of Oneida and State of New York, have invented certain new and useful Improvements in Safety or Relief Valves; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to safety or relief valves.

The purpose of the invention is to provide an improved valve of the type described which is readily operated upon the desired pressure being reached and which is especially adapted to re-seat itself evenly and tightly so as to avoid any leakage when the valve is intended to be closed.

A further object is to provide a valve of the type described which has its parts especially constructed so that its moving member will slide smoothly in a straight line and re-seat itself in a straight line thus avoiding noise, uneven wear upon the packing, the valve or the valve seat and causing the valve to be either seated or unseated all the way around.

Another object is to provide in combination with the constructions above mentioned means for readily but securely adjusting the valve to any desired pressure without sacrificing the advantages above named.

Further purposes and objects of my invention will appear from the specification and claims herein.

Fig. 1 is a side elevation of a safety or relief valve embodying my invention.

Fig. 2 is a vertical central sectional view of said valve.

Fig. 3 is a vertical central sectional view of the body of the valve.

Fig. 4 is a top view of the body of the valve.

Fig 5 is a view partly in side elevation and partly in vertical central cross-section of the cap of the valve.

Fig. 6 is a bottom plan view of the valve cap.

Fig. 7 is a central vertical section of the valve plunger.

Fig. 8 is a top view of said plunger.

Fig. 9 is a side view of one of the spring-centering blocks and Fig. 10 is an end view of the pointed end of said block.

Referring to the drawings in a more particular description, it will be seen that the valve comprises a body 11, a cap 12, plunger 13, top and bottom spring centering blocks 14, tension spring 15, a lock nut 16, a valve packing or washer 17 and a screw 18 for holding said washer in place.

The valve body 11 has a downwardly extending externally screw-threaded portion 19 for screwing the valve into place in the usual way. Through this downward extension 19 and the diaphragm portion of the body 11 there extends upwardly the centrally located inlet port 20 about the upper end of which there is provided on the body the valve seat 21 preferably raised above the surrounding level of the valve body. The body has a relatively long upwardly extending cylindrical portion 22 externally threaded to engage the cap 12. This cylindrical portion 22 provides the valve chamber 23 the wall of which is bored carefully to a cylinder with parallel sides throughout its length to the end that the circular plunger 13 may closely but easily slide in the chamber of the valve body. Through the bottom of the cylindrical portion 22 radially extending outlet ports 24 are provided.

The plunger 13 forms the real valve member and is cupshaped in form with its circular flange 25 projecting upwardly in order to give relatively great length to the plunger so that it may easily slide longitudinally of the valve chamber. The cupshaped form of the plunger, moreover, admits of the tension from the tension spring 15 being applied well down within the plunger which also operates to hold the plunger to movement in a right line from or towards the valve seat 21. To the bottom of the plunger 13 is secured a valve packing or washer 17 of any desired material by means of headed screw 18 extending through said washer up into the plunger.

In order to keep the pressure of the tension spring equalized on all sides of the plunger I provide at each end of the said spring, spring-centering blocks 14 each formed with a conical portion 26 and a cylindrical portion 27 of less diameter than the widest part of the conical portion whereby the shoulder 28 is provided. The cylindrical portion 27 fits within the end of the coiled tension spring 15 while the end of said spring bears against the shoulder 28. One of these blocks is interposed between the lower end of the spring and the upper surface of the plunger with the conical point of said block resting in a correspondingly shaped centrally arranged recess 29 in the cup of said plunger. The other block 14 is interposed between the upper end of the spring and the inner surface of the diaphragm portion of the cap 12 with the conical point of the block resting in a similar correspondingly shaped recess 30.

The cap 12 has a long downwardly extending side flange portion interiorly-threaded so that said cap may fit the cylindrical portion 22 of the valve body. It will now be obvious that when the parts are assembled as plainly shown in Fig. 2 any desired adjustment of the valve to operate at a given pressure may be had by rotating the cap up or down and so relieving or increasing the tension upon the spring. When the desired adjustment is reached the lock nut 16 is set up against the bottom of the cap so as to render the adjustment secure.

It will now be seen that the construction of the valve is such as to give great nicety and evenness of action to the plunger and that it will unseat and re-seat evenly and in a direct line against the valve seat thus preventing leakage when the valve is supposed to be closed and preventing any undue or uneven wearing of the valve packing. It will be noted also that the pressure from the tension spring is directed along the central axis of the valve and so assists in causing the plunger to move truly longitudinally of the valve. It will be seen also that the relatively long chamber of the valve body and the length of the cap admits of wide range of adjustment of the valve to different pressures. Upon removing the valve cap all portions of the valve are readily reachable for repair, lubrication or replacement.

What I claim as new and desire to secure by Letters Patent is:

1. A safety or relief valve comprising a body having a long externally-threaded hollow cylindrical portion forming a smooth parallel sided valve chamber, said body having an inlet port with a raised valve seat thereabout and having outlet ports through the chamber near the valve seat, a relatively long plunger sliding in said chamber and adapted to fit upon said seat or to slide therefrom, a cap internally screw-threaded to fit the chambered part of the valve body, a tension spring interposed between said cap and said plunger and adjusted to desired tension by rotation of said cap and spring centering blocks interposed between the ends of the spring and the cap and plunger.

2. A safety or relief valve comprising a body, having a long externally-threaded hollow cylindrical portion forming a smooth parallel sided valve chamber, said body having an inlet port with a valve seat thereabout and having outlet portions through the chamber near the valve seat, a relatively long cup-shaped plunger sliding in said chamber and adapted to fit upon said seat or to slide therefrom, a cap internally screw-threaded to fit the chambered part of the valve body, a tension spring interposed between said cap and said plunger and adjusted to desired tension by rotation of said cap and spring centering blocks interposed between the ends of the spring and the cap and plunger.

In witness whereof I have affixed my signature, this 22nd day of May, 1922.

GEORGE A. PARKER.